(12) United States Patent
Miyamoto et al.

(10) Patent No.: US 8,210,213 B2
(45) Date of Patent: Jul. 3, 2012

(54) MULTILAYER TUBE

(75) Inventors: Yasumitsu Miyamoto, Fuji (JP); Koji Mizutani, Ichinomiya (JP); Kazutaka Katayama, Kasugai (JP); Kazuhito Kasahara, Komaki (JP)

(73) Assignees: Wintech Polymer Ltd., Tokyo (JP); Tokai Rubber Industries, Ltd., Komaki-Shi, Aichi (JP)

( * ) Notice: Subject to any disclaimer, the term of this patent is extended or adjusted under 35 U.S.C. 154(b) by 583 days.

(21) Appl. No.: 12/409,043

(22) Filed: Mar. 23, 2009

(65) Prior Publication Data

US 2009/0246434 A1 Oct. 1, 2009

(30) Foreign Application Priority Data

Mar. 31, 2008 (JP) .................................. 2008-090763
Mar. 19, 2009 (JP) .................................. 2009-068702

(51) Int. Cl.
*F16L 11/04* (2006.01)
(52) U.S. Cl. ....................... 138/137; 138/141; 428/36.91
(58) Field of Classification Search .................. 138/137, 138/141; 428/36.91
See application file for complete search history.

(56) References Cited

U.S. PATENT DOCUMENTS

| | | | |
|---|---|---|---|
| 3,193,522 A | | 7/1965 | Neumann et al. |
| 4,968,778 A | * | 11/1990 | Still et al. ..................... 528/272 |
| 7,273,902 B2 | * | 9/2007 | Takahashi et al. ............. 524/195 |
| 2005/0053742 A1 | * | 3/2005 | Morohoshi et al. ......... 428/36.91 |
| 2005/0158499 A1 | * | 7/2005 | Ling et al. .................. 428/36.91 |
| 2006/0079638 A1 | * | 4/2006 | Matsushima et al. ........... 525/63 |
| 2007/0231521 A1 | * | 10/2007 | Katayama et al. ......... 428/36.91 |
| 2009/0163674 A1 | * | 6/2009 | Sakane et al. ................. 525/438 |

FOREIGN PATENT DOCUMENTS

| | | |
|---|---|---|
| JP | 6-23930 A | 2/1994 |
| JP | 7-96564 A | 4/1995 |
| JP | 2006-272630 A | 10/2006 |
| JP | 2007-261078 A | 10/2007 |

OTHER PUBLICATIONS

European Search Report of Application No. EP 09 25 0894 dated May 25, 2009.

* cited by examiner

*Primary Examiner* — James Hook
(74) *Attorney, Agent, or Firm* — Nixon & Vanderhye P.C.

(57) ABSTRACT

A multilayer tube comprises at least the following three layers: an inner layer contactable with a fuel component, a barrier layer preventing the fuel component permeating, and an outermost layer. In the multilayer tube, the inner layer comprises a poly(butylene terephthalate) resin composition containing at least (A) a poly(butylene terephthalate) resin, the barrier layer comprises a polyester resin composition, and the outermost layer comprises a poly(butylene terephthalate) resin composition containing (A) a poly(butylene terephthalate) resin, (B) an elastomer component, (C) an aromatic polycarbodiimide compound, and (D) an antioxidant.

12 Claims, No Drawings

MULTILAYER TUBE

FIELD OF THE INVENTION

The present invention relates to a multilayer tube (particularly, a fuel transport tube having a multilayer structure) having reduced permeability to fuels and improved softness, ductility, and impact resistance, and comprising a poly(butylene terephthalate) resin composition. More specifically, the present invention relates to a halogen-free multilayer tube comprising a polybutylene terephthalate) resin composition suitable for molding fuel parts (parts of a fuel system) and having improved toughness (including toughness even at a low temperature (or low-temperature toughness)), hydrolysis resistance, organic chemical resistance, ozone resistance, and layer-to-layer adhesiveness.

BACKGROUND OF THE INVENTION

To cope with more stringent regulations against vapor emission of fuel gases in the automotive field or other fields in recent years, high barrier properties against fuels have been investigated. Moreover, in order to reduce the weight of vehicles (such as an automobile) for improving fuel efficiency, the use of resins for fuel-related devices or peripheral devices thereof increases every year for reducing the weight of these devices. In response to the point, the demand for the fuel-barrier property of resins has increased. A fluorine-series resin, a poly(butylene naphthalate) (hereinafter, sometimes referred to as PBN), and others are known as a resin having a high barrier property against fuels. For example, Japanese Patent Application Laid-Open No. 96564/1995 (JP-7-96564A (Claims)) discloses a fuel transport tube which has an innermost layer comprising a resin selected from the group consisting of a fluorine resin and a polyamide-series resin, an intermediate layer comprising a poly(alkylene naphthalate) resin (e.g., a poly(butylene naphthalate)), an outer layer composed of a thermoplastic resin or a thermoplastic elastomer, and an adhesive layer formed between the innermost layer and the intermediate layer. Japanese Patent Application Laid-Open No. 23930/1994 (JP-6-23930A (Claims)) discloses a multilayer polymer hose or pipe which has at least a blocking layer comprising a polyester (such as a poly(butylene terephthalate) or a PBN) and is a coextrusion product.

However, there is a trend to restrict the use of halides including the fluorine-series resin for environmental reasons. In addition, it is difficult to bond or adhere the fluorine-series resin to another member, and the fluorine-series resin is unsuitable for a multilayer product. On the other hand, for the polyester such as the PBN, it is necessary to improve hydrolysis resistance in the case of using the polyester for a monolayer product. Alternatively, it is necessary to form a multilayer structure containing a layer formed of the polyester and a layer formed of a soft material. Thus, there was reported a product which was obtained by treating a surface of a polyester resin layer with plasma or sputter to convert the surface to a surface having an adhesive property and coating the polyester resin layer with a nylon or the like.

Japanese Patent Application Laid-Open No. 272630/2006 (JP-2006-272630A (Claims)) relates to a fuel hose having improved low-temperature characteristics, softness, and hydrolysis resistance and discloses a three-layer (or three-ply) fuel hose comprising a tubular inner layer, a layer having a low permeability to a fuel and being adjacent to and surrounding an outer peripheral surface of the inner layer, an outer layer being adjacent to and surrounding an outer peripheral surface of the low-permeability layer. In the fuel hose, the inner layer comprises a polyester resin softened by alloying or copolymerizing with use of an elastomer component, the low-permeability layer comprises at least one polyester-series resin selected from the group consisting of a poly(butylene naphthalate) and a poly(butylene terephthalate), and the outer layer comprises a blend polymer of a styrene-isobutylene block copolymer and a polyester elastomer whose copolymer component is at least one selected from the group consisting of a poly(tetramethylene glycol) and a dimer acid. Japanese Patent Application Laid-Open No. 261078/2007- (JP-2007-261078A (Claims)) relates to a fuel hose having improved low-temperature resistance, softness, hydrolysis resistance, weather resistance, and ozone resistance and discloses a three-layer (or three-ply) fuel hose comprising the same tubular inner layer and low-permeability layer (or layer having a low permeability to a fuel component) as mentioned above and an outer layer being adjacent to and surrounding an outer peripheral surface of the low-permeability layer and comprising a blend polymer of a poly(butylene terephthalate) and at least one member selected from the group consisting of a polymer fine particle having a core-shell structure, an ethylene-acrylic rubber (AEM), and a styrene-isobutylene copolymer. However, the elastomer component is required to have improved weather resistance to ozone or a light beam such as xenon. Moreover, the polystyrene-series elastomer such as the styrene-isobutylene block copolymer has an insufficient compatibility (or miscibility) with a poly(butylene terephthalate) or a polyester-series elastomer, which is a problem for the combination use. Therefore, the use of a compatibilizer (e.g. an ethylene-glycidyl methacrylate copolymer; EGMA) for overcoming the problem has been also reported.

SUMMARY OF THE INVENTION

It is therefore an object of the present invention to provide a multilayer tube (particularly, a multilayer fuel tube) which has a low permeability meeting regulations against (evaporative) emission of fuels and vapor thereof as well as softness, ductility, impact resistance, and improved layer-to-layer adhesiveness.

Another object of the present invention is to provide a multilayer tube (particularly, a multilayer fuel tube) having significantly improved hydrolysis resistance, weather resistance, and compatibility.

It is a further object of the present invention to provide a multilayer tube (particularly, a multilayer fuel tube) having an excellent toughness (including low-temperature toughness), hydrolysis resistance, organic chemical resistance, and ozone resistance.

The inventors of the present invention made intensive studies with focuses on a layer structure pattern of a multilayer tube and a resin composition satisfying demanded properties to achieve the above objects and finally found the followings: (1) a plurality of layers (particularly, at least an inner layer and an outer layer) comprising a poly(butylene terephthalate) (hereinafter, sometimes referred to as PBT) resin composition or a poly(butylene naphthalate) (hereinafter, sometimes referred to as PBN) resin composition are only coextruded without using an adhesive or conducting a secondary processing (e.g., sputtering) to produce a multilayer tube having a high layer-to-layer adhesiveness and improved various properties including hydrolysis resistance, (2) a tube comprising an inner layer and an outer layer, each comprising a soft PBT resin composition, and an intermediate layer (a barrier layer) comprising a PBT resin or a PSN resin having a high barrier property serves as a fuel tube having a high barrier property against fuels or vapor thereof and improved layer-to-layer adhesiveness, and (3) since particularly an outermost layer directly triggers a possible break of the tube, it is advantageous that the outermost layer is formed from a soft PBT resin composition having more excellent ductility, toughness, softness and weather resistance than a resin composition for forming an inner layer. The present invention was accomplished based on the above findings.

That is, the multilayer tube of the present invention comprises at least the following three layers: an inner layer contactable with a fuel components, a barrier layer preventing the fuel component permeating, and an outermost layer. The inner layer comprises a PET resin composition containing at least (A) a PBT resin, the barrier layer comprises a polyester resin composition (for example, a resin composition comprising at least one member selected from the group consisting of (A) a poly(butylene terephthalate) resin and (E) a polybutylene naphthalate) resin, e.g., a PBT resin composition or a PBN resin composition), and the outermost layer comprises a poly(butylene terephthalate) (PBT) resin composition containing (A) a PBT resin, (B) an elastomer component, (C) an aromatic polycarbodiimide compound, and (D) an antioxidant.

In such a multilayer tube, each PBT resin (A) forming the inner layer, the barrier layer, and the outermost layer may comprise a PBT homopolymer and/or a PBT copolymer, and a polyester elastomer (for example, a PBT elastomer). For example, each PST resin (A) forming the inner layer, the barrier layer, and the outermost layer may contain (A1) at least one member selected from the group consisting of a PUT homopolymer and a PBT copolymer and (A2) a polyester elastomer (e.g., a PBT elastomer), and the weight ratio of the polymer (A1) relative to the elastomer (A2) may be about 30/70 to 70/30. The polyester elastomer may be a PBT elastomer containing a PBT segment as a hard segment in a proportion of 20 to 90% by weight.

The elastomer component (B) may comprise an acrylic core-shell elastomer free from a diene component. Moreover, the antioxidant (D) may comprise a hindered phenol-series antioxidant or a combination of a hindered phenol-series antioxidant and a thioether-series antioxidant.

More specifically, in the multilayer tube, the inner layer, the barrier layer, and the outermost layer may be directly bonded in this order by coextrusion without using an adhesive agent. In such a multilayer tube, the inner layer may contain 20 to 40 parts by weight of the elastomer component (B) and 0.01 to 5 parts by weight of the aromatic polycarbodiimide compound (C) relative to 100 parts by weight of the PBT resin (A), the barrier layer may contain 0 to 5 parts by weight (e.g. 0.01 to 5 parts by weight) of the aromatic polycarbodiimide compound. (C) relative to 100 parts by weight of the PBT resin (A) and/or the PBN resin (E), and the outermost layer may contain 10 to 80 parts by weight of the elastomer component (B). 0.01 to 5 parts by weight of the aromatic polycarbodiimide compound (C), and 0.01 to 5 parts by weight of the antioxidant relative to 100 parts by weight of the PBT resin (A).

The PBT resin composition for the outermost layer may have a softness which is expressed by a flexural modulus measured in accordance with a measuring method defined by ISO178 of not more than 600 MPa, and a nominal strain defined by a tensile test measured in accordance with a measuring is method described in ISO527-1,2 of not less than 200%.

Incidentally, the multilayer tube may be a fuel tube, and the inner layer may be contactable with an automotive liquid fuel or a vapor of the fuel. The multilayer tube is preferably free from fractures in a 180° bending test after a heat aging treatment at a temperature of 120° C. for 1000 hours. The multilayer tube is preferably free from fractures in a 180° bending test after a pressure cooker test at 121° C. under 2 atm for 48 hours. Further, the multilayer tube preferably has a permeability of not more than 10 mg/test as a permeability to a fuel measured in accordance with SHED method, wherein the fuel is a composite fuel which contains 10 parts by volume of ethanol relative to 100 parts by volume of Fuel C containing toluene and isooctane in a volume percentage ratio of 50/50. In the SHED method, the permeability is evaluated as the following manner. Specifically, a composite fuel containing 100 parts by volume of Fuel C (containing toluene and isooctane in a volume percentage ratio of 50/50) and 10 parts by volume of ethanol is used as a gasoline for the evaluation test (hereinafter, the composite fuel is sometimes referred to as FC/E10). A hose is filled with the FC/E10, and both ends of the hose are sealed. The hose is allowed to stand at 40° C. for 1000 hours for stabilization. Thereafter, the FC/E10 is removed from the hose, and the hose is filled with fresh FC/E10, and both ends of the hose are sealed. The hose is allowed to stand under a predetermined heat cycle environment, and the amount of the permeated fuel is measured every 24 hours. This operation is repeatedly conducted three times. The maximum value of the three measurements is regarded as an amount of permeated fuel per one test [(mg/test)=(mg/24 Hr)].

In a preferred mode of the present invention, each layer (at least an inner layer and an outer layer) constituting the multilayer tube comprises a PBT resin composition. An outermost layer, which particularly requires softness or weather resistance, comprises the PBT homopolymer and/or the PBT copolymer (A1), each having a high weather resistance, the PBT elastomer (A2) having a PBT as a hard segment highly compatible with the polymer (A1), and the elastomer component (B) (particularly, a core-shell elastomer) in combination for imparting properties such as softness thereto. Further, addition of the aromatic polycarbodiimide compound (C) and the antioxidant (D) improves properties such as hydrolysis resistance of a polyester resin. In such a mode, the multilayer fuel tube which has excellent layer-to-layer adhesiveness, barrier property against fuels, softness, hydrolysis resistance, organic solvent resistance, and ozone resistance and of which all layers comprises a PBT resin composition can be efficiently produced by coextrusion molding.

Incidentally, in this specification, the term "elastomer component (S)" is used in distinction from the term "PET elastomer" The term "elastomer component (B)" does not include the meaning of "PBT elastomer".

DETAILED DESCRIPTION OF THE INVENTION

The multilayer tube of the present invention (particularly, a multilayer fuel tube) comprises at least three layers: a hollow cylindrical inner layer contactable with a fuel component, a barrier layer provided around (an outer peripheral surface of) the inner layer and preventing the fuel component permeating, and an outermost layer provided around (an outer peripheral surface of) the barrier layer.

(1) The inner layer often has a resistance to a fuel component (fuel resistance) and softness. The inner layer is not particularly limited to a specific one as long as the inner layer comprises at least (A) a PBT resin. The inner layer usually comprises a PBT resin composition containing at least the PBT resin (A). In particular, when the PBT resin composition for forming the inner layer comprises a PST homopolymer and/or a PBT copolymer, and a PBT elastomer, the inner layer has improved softness and ductility. Moreover, the inner layer requires adhesiveness to the adjacent barrier layer. Therefore, it is advantageous that the inner layer comprises a PBT resin composition containing (A) a PBT resin and (B) an elastomer component. Moreover, the PBT resin (A) may comprise a PBT homopolymer and/or a PBT copolymer or may comprise a PBT elastomer alone. Use of such a resin composition improves the adhesiveness between the inner layer and the barrier layer by coextrusion. In the resin composition for the inner layer, the elastomer component (B) may be used alone or in combination. Since the inner layer is directly contactable with a fuel, the elastomer component (B) preferably includes an elastomer having as light (or little) dimensional change by a fuel, for example, a core-shell elastomer (particularly, core-shell elastomer free from a butadiene component).

In the PBT resin composition for the inner layer, the amount to be used of the elastomer component (B) may be within a range which allows the elastomer component (B) to impart required softness to the inner layer, for example, about 20 to 40 parts by weight relative to 100 parts by weight of the PBT resin (A). An excessively small amount of the elastomer component (B) cannot impart a desired softness to the inner layer. An excessively large amount of the elastomer component (B) deteriorates the fuel resistance of the inner layer. In order to improve the hydrolysis resistance, the PBT resin composition for the inner layer further contains (C) an aromatic polycarbodiimide compound in many cases. The amount to be used of the aromatic polycarbodiimide compound (C) may be about 0.01 to 5 parts by weight relative to 100 parts by weight of the PB resin (A). The aromatic polycarbodiimide compound (C) may be used in combination with an epoxy compound.

(2) For the barrier layer, a polyester resin (for example, a crystalline aromatic polyester resin) is used from the viewpoint of a barrier property against a fuel component and adhesiveness to the inner and outer layers. The polyester resin may include, for example, a poly(alkylene arylate) resin [e.g., a poly(butylene terephthalate) resin (PET resin), a poly(butylene naphthalate) resin (PBN resin), a polycethylene terephthalate) resin (PET resin), and a poly(ethylene naphthalate resin) (PEN resin)] and a thermoplastic elastomer having a poly(alkylene arylate) unit as a hard segment [e.g., a PBT-series thermoplastic elastomer (PBT-series TPEE) and a PEN-series thermoplastic elastomer (PBN-series TPEE)]. These resins may be used alone or in combination. Among these resins, a PBT resin ora PBN resin is preferably used. The barrier layer may comprise a PBT resin alone or a PBN resin alone.

When the barrier layer comprises the PBT resin composition, it is preferable that the PBT resin composition contain a PBT resin in a proportion of not less than 95% by weight in order to maintain a high barrier property. In a preferred mode, to improve impermeability (barrier property) against fuel components and hydrolysis resistance, the barrier layer may comprise a resin composition (e.g., a PBT resin composition) containing a polyester resin (e.g., a PBT resin and a PBN resin) and (C) an aromatic polycarbodiimide compound. It is also preferred to use a poly(butylene terephthalate) homopolymer and/or a poly(butylene terephthalate) copolymer alone as the PBT resin. In the resin composition for the barrier layer (e.g., a PBT resin composition), the amount to be used of the aromatic polycarbodiimide compound (C) depends on the species of the polyester resin and may be selected from the range of about 0 to 5 parts by weight relative to 100 parts by weight of the polyester resin (such as a PBT resin or a PEN resin). The amount of the aromatic polycarbodiimide compound (C) may usually be about 0.01 to 5 parts by weight (e.g., about 0.1 to 3 parts by weight) relative to 100 parts by weight of the polyester resin. Incidentally, the PBN resin does not necessarily contain the aromatic polycarbodiimide compound. An excessively small amount of the aromatic polycarbodiimide compound (C) decreases the hydrolysis resistance of the barrier layer. An excessively large amount of the aromatic polycarbodiimide compound (C) easily causes generation of gel components or carbides in a melt-molding process. In a combination use with the polyester resin (such as a PBT resin or a PBN resin), the aromatic polycarbodiimide compound (C) may be used alone or together with an epoxy compound. Incidentally, an additive (for example, a filler) may be added to the PBT resin composition for the barrier layer. In order to maintain a high barrier property, it is preferable that the PET resin composition contain a PBT resin in a proportion 15, of not less than 95% by weight.

(3) The outermost layer requires higher softness, ductility, toughness, impact resistance, and others, compared with the inner layer, in order to conform with the deformation at the install of the tube or caused by actual use. Moreover, since the outermost layer is exposed to ambient air (or outside air), it is necessary to take the weather resistance of the outermost layer into consideration. Therefore, it is advantageous that the outermost layer comprises a PET resin composition containing (A) a PBT resin, (B) an elastomer component, (C) an aromatic polycarbodiimide compound, and (D) an antioxidant. If necessary, the PBT resin composition may further contain an epoxy compound.

In the PBT resin composition for the outermost layer, the amount to be used of the elastomer component (B) may be about 10 to 80 parts by weight (for example, about 20 to 75 parts by weight) relative to 100 parts by weight of the PST resin (A). The amount to be used of the aromatic polycarbodiimide compound (C) may be about 0.01 to 5 parts by weight (for example, about 0.1 to 2 parts by weight) relative to 100 parts by weight of the PBT resin (A). Moreover, the amount to be used of the antioxidant (D) may be about 0.01 to 5 parts by weight (for example, about 0.1 to 2 parts by weight) relative to 100 parts by weight of the PBT resin (A).

In the outermost layer, when the proportion of the soft component (PST elastomer) is increased for achieving a predetermined elastic modulus without using the elastomer component (e.g., a core-shell polymer), for example, with using only the PET resin (the PBT homopolymer and/or the PBT copolymer, and the PBT elastomer), the resin composition forms an islands-in-the-sea structure, in which the PBT resin forms the islands. Therefore, it is difficult to meet properties such as weather resistance. On the other hand, when only the elastomer component (e.g., a core-shell polymer) and the PBT homopolymer and/or the PBT copolymer are used for achieving the predetermined elastic modulus, the proportion of the elastomer component (e.g., a core-shell polymer), which is incompatible with the PBT resin, is increased to induce aggregation of the elastomer component. As a result, the outermost layer decreases in low-temperature impact resistance, and it is difficult to form a molded product. That is, it is desirable that the elastic modulus be adjusted by using the elastomer component (e.g. a core-shell polymer), which is incompatible with the PBT resin, while keeping the proportion of PBT homopolymer and/or PBT copolymer in the PBT resin as a base resin for maintaining the weather resistance in a ratio not less than a predetermined value.

Incidentally, the number of layers in the multilayer tube is at least three. The multilayer tube can have a four-layer (or four-ply) structure, in which an intermediate layer comprising the PBT resin composition for the inner is layer is interposed between the barrier layer and the outermost layer. For example, an intermediate layer (an intermediate layer comprising a PBT resin composition) may be interposed between the inner layer and the barrier layer and/or between the barrier layer and the outermost layer. If necessary, an adhesive layer may further be interposed between the respective layers. The present invention improves the layer-to-layer adhesiveness and does not necessarily need the adhesive layer. Therefore, in the multilayer tube of the present invention, the inner layer, the barrier layer, and the outermost layer are usually directly bonded in this order by coextrusion molding without using an adhesive.

Components to be used in (1) the inner layer, (2) the barrier layer and (3) the outermost layer, and the proportion of each component will hereinafter be described.

Polyester Resin

The polyester resin may include, for example, a poly(alkylene arylate)-series resin [e.g., apoly(butylene terephthalate) resin (PBT resin), a poly(butylene naphthalate) resin (PEN resin), a polytethylene terephthalate) resin (PET resin), and a poly(ethylene naphthalate resin) (PEN resin)] and a thermoplastic elastomer having a poly(alkylene arylate) unit as a hard segment [e.g., a PBT-series thermoplastic elastomer (a PST-series TPEE, a PET elastomer) and a PBN-series thermoplastic elastomer (a PBN-series TPEE, a PBN elastomer)]. These resins may be used alone or in combination. Among these resins, a PET resin or a PBN resin is preferably used.

(A) Poly(butylene terephthalate) Resin (PST Resin)

The PBT resin (A) may comprise (A1) a poly(butylene terephthalate) homopolymer (PBT homopolymer) and/or a poly(butylene terephthalate) copolymer (PBT copolymer) and (A2) a polyester elastomer (for example, a PET elastomer). The PBT homopolymer or PBT copolymer (A1) is obtainable (or is obtained) by a polycondensation of a dicarboxylic acid component at least containing terephthalic acid or a derivative thereof capable of forming an ester (or an ester-forming derivative thereof) (for example, a lower alcohol ester such as a methyl ester, an acid chloride, and an acid anhydride) and a glycol component at least containing an alkylene glycol having four carbon atoms (1,4-butanediol) or a derivative thereof capable of forming an ester (or an ester-forming derivative thereof).

Examples of the PBT copolymer may include a polymer obtainable (or obtained) by using a copolymerizable monomer in place of some of (e.g., about 1 to 30% by mol, particularly, about 3 to 25% by mol, of) the terephthalic acid components and/or the 1,4-butanediol components Examples of the copolymerizable monomer may include a dicarboxylic acid component and a diol component. The dicarboxylic acid may include, for example, an asymmetrical benzenedicarboxylic acid (such as phthalic acid or isophthalic acid), an aromatic polycarboxylic acid (such as a naphthalenedicarboxylic acid or pyromellitic acid), an aliphatic $C_{4-12}$dicarboxylic acid (such as adipic acid), and an alicyclic $C_{8-12}$dicarboxylic acid. The diol component may include, for example, a $C_{2-10}$alkylene glycol or alkene glycol (such as ethylene glycol, propylene glycol, 1,4-butenediol, neopentyl glycol, 1,5-pentanediol, or 1,6-hexanediol), a (poly)oxyalkylene glycol (such as diethylene glycol), a $C_{5-12}$cycloalkanediol (such as 1,4-cyclohexazediol or 1,4-cyclohexanedimethanol), bis(4-hydroxy)diphenyl, a bisphenol compound [e.g., a bis(hydroxyaryl)$C_{1-6}$alkane (such as bis(4-hydroxyphenyl)methane or bis(4-hydroxyphenyl)propane), a bis(hydroxyaryl)$C_{4-10}$cycloalkane, a bis(hydroxyaryl)ether, a bis(hydroxyaryl)sulfone, a bis(hydroxyaryl)sulfide, and a bis(hydroxyaryl)ketone], and an alkylene oxide adduct thereof. If necessary, a hydroxycarboxylic acid (such as hydroxybenzoic acid or hydroxynaphthoic acid) and/or a lactone (e.g., a $C_{3-12}$lactone such as ε-caprolactone) may be copolymerized. Further, if necessary, a polyfunctional (or multifunctional) compound, for example, a polycarboxylic acid (such as trimellitic acid) and/or a polyol (such as glycerin, trimethylolpropane, trimethylolethane, or pentaerythritol) may be used in combination. The homopolymers and copolymers may be used alone or in combination. The preferred PBT resin (A1) includes a highly crystalline resin, for example, a poly(butylene terephthalate) homo- or copolymer having a copolymerizable monomer unit content of about 0 to 10% by mol in the whole monomer unit, particularly, a poly (butylene terephthalate) homopolymer (a homopoly(butylene terephthalate) resin).

It is advantageous that the PBT polymer (A1) has an intrinsic viscosity of about 0.6 to 1.4 dl/g, preferably about 0.7 to 1.2 dl/g, when measured in o-chlorophenol as a solvent at 35° C. A PBT polymer having the intrinsic viscosity of less than 0.6 dl/g insufficiently reduces the volume (or amount) of a gas (such as tetrahydrofuran) generated from a poly(butylene terephthalate) resin, A PBT polymer having the intrinsic viscosity over 1.4 dl/g decreases flowability for molding. Incidentally, in order to improve hydrolysis resistance, it is preferable to select a resin having a high intrinsic viscosity showing the allowable range of flowability.

The species of the polyester elastomer (A2) is not particularly limited to a specific one. The polyester elastomer (A2) usually contains a PBT elastomer. The PBT elastomer contains a poly(butylene terephthalate) as a hard segment and a soft segment. Addition of the PBT elastomer (an elastomer component having a poly(butylene terephthalate) unit) can impart softness, ductility, and low-temperature impact resistance to the PBT polymer and enhance compatibility with the PBT polymer.

The hard segment is not particularly limited to a specific one as long as the segment has a poly(butylene terephthalate) skeleton (PBT skeleton). Terephthalic acid and an ester-forming derivative thereof (terephthalic acid component) is used as a dicarboxylic acid component forming the hard segment, and 1,4-butanediol is utilized as a diol component forming the hard segment. In the same manner as the poly(butylene terephthalate)-series copolymer, a copolymerizable monomer (e.g., isophthalic acid and naphthalenedicarboxylic acid) may be used in place of some of the terephthalic acid components forming the hard segment. Moreover, in the same manner as in the polytbutylene terephthalate) copolymer, a copolymerizable monomer (e.g. a $C_{2-10}$alkylene glycol, a (poly)oxyalkylene glycol, a $C_{5-12}$cycloalkanediol, a bisphenol compound, or an alkylene oxide adduct thereof) may be used in place of some of 1,4-butanediols forming the hard segment. Furthermore, the hard segment usually comprises a crystalline PBT skeleton. Further, the hard segment usually has a short-chain ester skeleton.

In the PBT elastomer, at least one soft segment selected from the group consisting of an aliphatic polyester and a polyether may be used as the soft segment. The soft segment may be a polyester containing a polyether unit.

The polyester-based soft segment may be obtained from a polycondensation product of a dicarboxylic acid (for example, an aliphatic $C_{4-12}$dicarboxylic acid such as adipic acid) and a diol [for example, an aliphatic diol, edge, a $C_{2-10}$alkylene glycol (such as 14-butanediol) and a (poly) oxyalkylene glycol (such as diethylene glycol)], a polycondensation product of a hydroxycarboxylic acid, a ring-opening polymer of a lactone (for example, a $C_{3-12}$lactone such as ε-caprolactone), and others. The polyester-based soft segment is usually an amorphous polyester. Concrete examples of the polyester as the soft segment include a caprolactone polymer, a polyester of a $C_{2-6}$alkylene glycol and a $C_{6-12}$alkanedicarboxylic acid [for example, a polyethylene adipate) and a poly(butylene adipate)], and others. The number average molecular weight of the polyester may be selected from the range of about 200 to 15000 and may usually be about 200 to 10000 (e.g., about 300 to 8000).

The polyether-based soft segment may include a poly (alkylene glycol), for example, a poly$C_{2-4}$alkylene glycol such as a poly(oxyethylene glycol), a poly(oxypropylene glycol), a poly(oxytetramethylene glycol). In particular, a poly (oxytetramethylene glycol) is preferable. The number average molecular weight of the polyether may be selected from the range of about 200 to 10000 and may usually be about 200 to 6000.

The soft segment may be a polyester having a polyether unit, for example, a copolymer (a polyether-polyester) of the above-mentioned aliphatic polyester and the above-mentioned polyether, and a polyester of the above-mentioned polyether [e.g., a polyoxyalkylene is glycol (such as a poly (oxytetramethylene glycol))] and an aliphatic dicarboxylic acid.

In the polyester elastomer (A2) (e.g., a PBT elastomer), the weight ratio of the hard segment relative to the soft segment [the former/the latter] may be about 20/80 to 90/10, preferably about 30/70 to 85/15, and more preferably about 40/60 to 80/20.

Further, in the PBT resin (A), the weight ratio of the PBT homopolymer and/or PUT copolymer (A1) relative to the polyester elastomer (A2) (e.g., a PBT elastomer) [(the former (A1)/the latter (A2)] may be selected from the range of about 20/80 to 80/20 depending on the species of each component, the content of the PBT skeleton (or unit), and others. The weight ratio is usually about 30/70 to 70/30 and preferably about 40/60 to 60/40, A PET resin having too a high PST elastomer content makes the properties of the PBT resin composition insufficient and decreases weather resistance, chemical resistance, heat resistance, and others. A PET resin having too a low PET elastomer content makes softness or ductility of the PET resin composition insufficient and also decreases low-temperature impact resistance. Incidentally, when the PET resin (A) is used alone, it often difficult to balance the properties mentioned the above and other properties such as weather resistance. Even when studies are performed in a low-content range of the PBT elastomer component, it is usually difficult to achieve a predetermined elastic modulus.

(E) Poly(butylene naphthalate) Resin (PBN Resin)

The PEN resin is not particularly limited to a specific one as long as a main repeating unit thereof contains a butylene naphthalate formed from 1,4-butanediol and a naphthalenedicarboxylic acid (e.g., 2,6-naphthalenedicarboxylic acid). The PBN resin may be a poly(butylene naphthalate) homopolymer (a PBN homopolymer) or a poly(butylene naphthalate) copolymer (a PBN copolymer), which is a copolymer of butylene naphthalate component and a third component. The third component (copolymerizable component) may be any one of a dicarboxylic acid component, a glycol component, and an aromatic diol component. The third component may include the copolymerizable component as described in the paragraph of the PBT copolymer. Incidentally, the above-mentioned "main" unit occupies not less than 70% by mol of the total repeating units.

For example, an acid component (a dicarboxylic acid component) as the third component may include an aromatic dicarboxylic acid such as isophthalic acid, phthalic acid, a diphenyldicarboxylic acid, a diphenyletherdicarboxylic acid, a diphenylsulfonedicarboxylic acid, a diphenylketonedicarboxylic acid, sodium-sulfoisophthalic acid, or dibromoterephtbalic acid, an aliphatic dicarboxylic acid such as malonic acid, succinic acid, adipic acid, azelaic acid, sebacic acid, or decanedicarboxylic acid, and an alicyclic dicarboxylic acid such as cyclohexanedicarboxylic acid, decalindicarboxylic acid, hexahydroterephthalic acid. These acid components may be an ester-bond-formable derivative (or an ester-bond-forming derivative). The term "ester-bond-formable derivative" or "ester-bond-forming derivative" means a compound which easily forms an ester bond by a chemical reaction. Concrete examples of such a derivative include an acid halide, a lower alkyl ester, or a lower aromatic ester, and others. These dicarboxylic acid components may be used alone or in combination.

The glycol component as the third component may include an aliphatic diol component [for example, an alkylene glycol such as ethylene glycol, propylene glycol, trimethylene glycol, or hexamethylene glycol, and a (poly)oxyalkylene glycol such as diethylene glycol, triethylene glycol, a polyethylene glycol, or a poly(tetramethylene glycol)], an alicyclic diol component [for example, cyclohexanediol and cyclohexanedimethanol] an aromatic diol component [for example, an alkylene oxide adduct of a bisphenol compound, such as 2,2-bis[4-(2-hydroxyethoxy)phenyl]propane], and others.

Moreover, the third component may include an aliphatic hydroxycarboxylic acid component [for example, glycolic acid, hydroacrylic acid, and 3-oxypropionic acid], an alicyclic hydroxycarboxylic acid component [for example, asiatic acid and quinovatic acid], and an aromatic hydroxycarboxylic acid component [for example, salicylic acid, m-hydroxybenzoic acid, p-hydroxybenzoic acid, mandelic acid, and atrolactic acid]. These components may be used alone or in combination. Further, the aromatic diol component may include, for example, hydroquinone, catechol, naphthalenediol, resorcin, 4,4'-dihydroxy-diphenylsulfone, bisphenol A [2,2'-bis(4-hydroxyphenyl)propane], and tetrabromobisphenol A. These components may also be used alone or in combination.

Furthermore, a polyfunctional compound having three or more functional groups may be copolymerized as long as the polymer chain comprising a poly(butylene naphthalate) is substantially linear. Examples of such a polyfunctional compound include glycerin, trimethylolpropane, pentaerythritol, trimellitic acid, trimesic acid, pyromellitic acid, tricarballylic acid, and gallic acid. If necessary, a monofunctional compound (such as o-benzoylbenzoic acid or naphthoic acid) may be copolymerized together.

The PBN resin (a PBN homopolymer or a PBN copolymer) may be produced by a conventionally known process for producing a poly(butylene naphthalate). For example, the PBN resin may be produced by an esterification among a naphthalenedicarboxylic acid (e.g., 2,6-naphthalenedicarboxylic acid), 1,4-butanediol and an optional third component or a transesterification among a lower alkyl ester of a naphthalenedicarboxylic acid (e.g., a dimethyl ester), 1,4-butanediol and an optional third component.

(B) Elastomer Component

The elastomer component may be various components which imparts softness to the resin composition, for example, an ethylene-vinyl acetate copolymer rubber, an acrylic rubber, a diene-series rubber (a diene-series elastomer such as a natural rubber, an isoprene rubber, a chloroprene rubber, or a styrene-butadiene copolymer rubber), an olefinic rubber (e.g., an ethylene-propylene rubber), a fluorine rubber (e.g., a vinylidene fluoride-perfluoropropene copolymer)), a silicon-containing rubber (a silicon-series elastomer), and a urethane-series rubber. These elastomer components may be used alone or in combination. Among these elastomer components, an elastomer component free from a diene component, particularly a core-shell elastomer, is preferred.

In the core-shell elastomer, one of the core layer and the shell layer may comprise a rubber component (a soft component) and the other may comprise a hard component. In practical cases, the core-shell elastomer usually has a multilayer structure having a core layer comprising a rubber component and a shell layer comprising a hard resin (e.g., a glassy resin), the core layer being coated (or covered) with or included in the shell layer.

The rubber component may comprise, for example, a polymer of an unsaturated bond-containing monomer [for example, an acrylic rubber, a diene-series rubber (a diene-series elastomer), an olefinic rubber (e.g., an ethylene-propylene rubber), and a fluorine-containing rubber (e.g., a vinylidene fluoride-perfluoropropene copolymer)], a silicon-containing rubber (a silicon-series elastomer), and a urethane-series rubber. The preferable elastomer is free from a diene component (for example, a butadiene component). Therefore, an elastomer free from a diene component (a butadiene component or a diene-series rubber), preferably an acrylic rubber, is used as the rubber component. In some cases, a copolymer and/or graft polymer of a silicon-containing rubber may be used as the rubber component. Incidentally, in spite of being a diene-series rubber (diene-series elastomer), a hydrogenated rubber, for example, a hydrogenated nitrile rubber or the like, can be used. The preferable core-shell elastomer includes an acrylic core-shell elastomer.

The acrylic rubber constituting the core layer may be obtained form a polymerization of an acrylic ester (or acrylate) and a small amount of a crosslinking monomer (or crosslinkable monomer). The acrylic ester may include, for example, a $C_{1-12}$alkyl acrylate such as methyl acrylate, ethyl acrylate, propyl acrylate, butyl acrylate, isobutyl acrylate, hexyl acrylate, 2-ethylhexyl acrylate, or lauryl acrylate. Among these acrylic esters, a $C_{2-8}$alkyl acrylate such as ethyl acrylate, butyl acrylate, or 2-ethylhexyl acrylate (particularly, an alkyl acrylate containing at least butyl acrylate) is preferable. These acrylic esters may be used alone or in combination.

The crosslinking monomer may include, for example, an alkylene poly(meth)acrylate (e.g., butylene di(meth)acrylate); a polyfunctional (meth)acrylate having a plurality of (meth)acryloyl groups for example, ethylene glycol di(meth) acrylate, butylene glycol di(meth)acrylate, poly(or oligo)ethylene glycol di(meth)acrylate (e.g. diethylene glycoldi (meth)acrylate, and triethylene glycol di(meth)acrylate), glycerin tri(meth)acrylate, trimethylolethane tri(meth)acrylate, trimethylolpropane di(meth)acrylate, trimethylolpropane tri(meth)acrylate, pentaerythritol di(meth)acrylate, pentaerythritol tetra(meth)acrylate, dipentaerythritol tetra(meth) acrylate, and dipentaerythritol hexa(meth)acrylate; a polyfunctional vinyl compound having a vinyl group, for example, vinyl(meth)acrylate and divinylbenzene; and a polyfunctional allyl compound having a plurality of allyl groups, for example, allyl (meth)acrylate, diallyl malate, diallyl fumarate, diallyl itaconate, monoallyl malate, monoallyl fumarate, and triallyl cyanurate. For example, a hydrolytically condensable compound [for example, a silane coupling agent having (meth)acryloyl group (e.g., (meth)acryloyloxyalkyltrialkoxysilane such as 3-trimethoxysilylpropyl(meth) acrylate)] may also be used as the crosslinking monomer. The representative examples of the crosslinking monomer include butylene diacrylate. These crosslinking monomers may be used alone or in combination.

The amount to be used of the crosslinking monomer may be, for example, about 0.1 to 10 parts by weight (e.g., about 0.1 to 5 parts by weight and preferably about 0-2 to 3 parts by weight) relative to 100 parts by weight of the whole monomer.

The silicon-containing rubber may comprise, for example, a dimethylpolysiloxane chain, a methylvinylpolysiloxane chain, a methylphenylpolysiloxane chain, and a copolymer chain of these siloxane units [e.g., a dimethylsiloxane-methylvinylsiloxane copolymer chain, a dimethylsiloxane-methylphenylsiloxane copolymer chain, a dimethylsiloxane-methyl(3,3,3-trifluoropropyl)siloxane copolymer chain, a dimethylsiloxane-methylvinylsiloxane-methylphenylsiloxane copolymer chain]. Both end groups of the silicone rubber may be, for example, a trimethylsilyl group. The silicon-containing rubber may be obtained by a polymerization of an organosiloxane series monomer. The organosiloxane-series monomer may include, for example, hexamethyltricyclosiloxane, octamethylcyclosiloxane, decamethylpentacyclosiloxane, dodecamethylhexacyclosiloxane, trimethyltriphenylsiloxane, tetramethylphenylcyclotetrasiloxane, and octaphenylcyclotetrasiloxane.

The glass transition temperature of the rubber component may be, for example, lower than 0° C. (e.g., not higher than −10° C.), preferably not higher than −20° C. (e.g., about 180° C. to −25° C.), and more preferably not higher than −30° C. (e.g., about −150° C. to −40° C.).

The shell layer usually comprises a hard resin component (or glassy resin component) and may usually comprise a vinyl-series polymer (e.g., a vinyl-series copolymer). The vinyl-series polymer (vinyl-series copolymer) may comprise a homo- or copolymer of at least one monomer selected from the group consisting of an aromatic vinyl monomer (such as styrene or α-methylstyrene), a vinyl cyanide monomer (e.g., (meth)acrylonitrile), a methacrylic ester-series monomer (or a methacrylate monomer), and an acrylic ester monomer (or an acrylate monomer). The methacrylic ester-series monomer may include, for example, an alkyl methacrylate (e.g., a $C_{1-20}$alkyl methacrylate such as methyl methacrylate, ethyl methacrylate, propyl methacrylate, butyl methacrylate, hexyl methacrylate, or 2-ethylhexyl methacrylate, preferably a $C_{1-10}$alkyl methacrylate, and more preferably a $C_{1-6}$alkyl methacrylate), an aryl methacrylate (e.g., phenyl methacrylate), and a cycloalkyl methacrylate (e.g., cyclohexyl methacrylate). The acrylic ester monomer may include an acrylic ester described in the paragraph of the above-mentioned core layer. The vinyl-series polymer is often a polymer of at least one member selected from the group consisting of a methacrylic monomer and an aromatic vinyl-series monomer [particularly, at least methyl methacrylate)]. Incidentally, the vinyl-series polymer constituting the shell layer may be a copolymer of the vinyl monomer and the above-mentioned crosslinking monomer.

The glass transition temperature of the shell layer may be, for example, not lower than 30° C. (e.g., about 30° C. to 300° C.), preferably not lower than 50° C. (e.g., about 60° C. to 250° C.), and more preferably hot lower than 70° C. (e.g. about 80° C. to 200° C.).

In the core-shell polymer, the weight ratio of the core layer relative to the shell layer [the former/the latter] may be about 95/5 to 5/95 (e.g., about 95/5 to 30/70) and preferably about 90/10 to 10/90 (e.g., about B5/15 to 50/50).

The mean particle diameter of the core-shell polymer (core-shell polymer particle) may be selected from the range of, for example, about 0.05 to 10 μm. The mean particle diameter thereof may be, for example, about 0.05 to 5 μm and preferably about 0.1 to 3 nm.

In the core-shell elastomer, the rubber layer and the shell layer are usually bonded to each other by a graft bond. The graft bond is obtained by, if necessary, adding a graft-crossing agent reactive to the shell layer to the polymerization component of the core layer (rubber layer) to introduce a reactive group to the rubber layer and then forming the shell layer. The graft-crossing agent for the silicon-containing rubber may include an organosiloxane having a vinyl bond and/or a thiol group (for example, (meth)acryloxysiloxane and vinylsiloxane), and others. Moreover, in terms of chemical resistance, it is preferable that the core-shell elastomer free from a butadiene component be insoluble in a mixed solution containing toluene and isooctane in a volume ratio of 1/1 at a room temperature (about 20 to 25° C.).

Incidentally, the core-shell polymer may be prepared by a conventional method (e.g., emulsion polymerization, seed polymerization, microsuspension polymerization, and suspension polymerization). A commercially available product may be used as the core-shell polymer. For example, the core-shell polymer is available as "PARALOID EXL-2314" from Rohm and Haas Japan K.K.

The amount to be used of the elastomer component (B) (such as the core-shell elastomer) may be selected depending on the properties of each layer. For example, in the PBT resin composition for the inner layer, the amount to be used of the elastomer component (B) may be about 20 to 40 parts by weight relative to 100 parts by weight of the PBT resin (A). Moreover, when the PBT resin composition is used for the barrier layer, the resin composition may contain the elastomer component (B) as long as the barrier layer does not deteriorate barrier property. The resin composition for the barrier layer is usually free from the elastomer component (B).

In the PBT resin composition for the outermost layer, the amount to be used of the elastomer component (B) may be about 10 to 80 parts by weight and preferably about 15 to 80 parts by weight relative to 100 parts by weight of the PBT resin (A). An excessively small amount of the elastomer component makes it difficult to improve impact resistance and softness of the outermost layer. Incidentally, the elastomer component (B) is usually incompatible with the PBT resin component (A). An excessively large amount of the elastomer component not only sometimes makes the improvement in impact resistance or softness insufficient due to generation of aggregation or the like but also sometimes deteriorates these properties.

(C) Aromatic Polycarbodiimide Compound

The aromatic polycarbodiimide compound (C) has a carbodiimide group (—N=C=N—) in a molecule thereof and contains an aromatic component in a skeleton thereof. A carbodiimide compound of which skeleton contains an aliphatic component alone makes it difficult to improve the hydrolysis resistance of the resin composition.

The aromatic polycarbodiimide compound may include, for example, a poly(diphenylalkanecarbodiimide) which may or may not have a substituent group (for example, at least one substituent group selected from the group consisting of an alkyl group, a nitro group, an amino group (or an N-substituted amino group), a hydroxyl group, an alkoxy group, and a halogen atom) (for example, a poly(4,4'-diphenylmethanecarbodiimide), a poly(3,5'-dimethyl-4,4'-biphenylmethanecarbodiimide), and a poly(3,5'-dimethyl-4,4'-diphenylmethanecarbodiimide)) and a poly(arylenecarbodiimide) which may or may not have the substituent group [for example: a poly(p-phenylenecarbodiimide), a poly(m-phenylenecarbodiimide), a poly(naphthylenecarbodiimide), a poly(1,3-diisopropylphenylenecarbodiimide), a poly(1-methyl-3,5-diisopropylphenylenecarbodiimide), a poly(1,3,5-trlethylphenylenecarbodiimide), and a poly(triisopropylphenylenecarbodiimide)]. These aromatic polycarbodiimide compounds may be used alone or in combination.

Among these carbodimide compounds, a poly(4,4'-diphenylmethanecarbodiimide), a poly(phenylenecarbodiimide), and a poly(triisopropylphenylenecarbodiimide) are preferably used.

The number average molecular weight of the polycarbodiimide compound is about 1,000 to 30,000 and preferably about 2,000 to 25,000. A polycarbodiimide compound having an excessively low number average molecular weight possibly has an insufficient heat resistance. A polycarbodiimide compound having an excessively high number average molecular weight possibly has an insufficient dispersibility in the resin or an insufficient effect to improve hydrolysis resistance.

The amount to be used of the aromatic polycarbodiimide compound (C) may be selected from the range of about 0 to 5 parts by weight relative to 100 parts by weight of the polyester resin (A) (e.g., the PBT resin and/or the PBN resin (E)), depending on the species of the polyester resin. The amount of the aromatic polycarbodiimide compound (C) relative to 100 parts by weight of the polyester resin (A) is usually about 0.01 to 5 parts by weight, preferably about 0.1 to 3 parts by weight, and more preferably about 0.2 to 1.5 parts by weight. An excessively small amount of the aromatic polycarbodiimide compound (C) makes it difficult to achieve a high hydrolysis resistance. An excessively large amount of the aromatic polycarbodiimide compound (C) easily causes lowering of flowability, or generation of gel components or carbides in a compounding or melt-molding process.

(D) Antioxidant

The antioxidant may include a hindered phenol-series antioxidant, a thioether-series antioxidant, a hindered amine-series antioxidant, a phosphorus-containing antioxidant, and others.

The hindered phenol-series antioxidant may be a monocyclic hindered phenolic compound, a polycyclic hindered phenolic compound in which rings are connected or bonded to each other by a hydrocarbon group or a group containing a sulfur atom, a hindered phenolic compound having an ester group or an amide group, and others. The hindered phenol-series antioxidant may include, for example, 2,6-di-t-butyl-p-cresol, a $C_{2-10}$alkylene bis(t-butylphenol) [e.g., 2,2'-methylene bis(4-methyl-6-t-butylphenol), and 4,4'-methylene bis(2,6-di-t-butylphenol)], a tris(di-t-butyl-hydroxybenzyl) benzene [e.g. 1,3,5-trimethyl-2,4,6-tris(3,5-di-t-butyl-4-hydroxybenzyl)benzene], a $C_{2-10}$alkanediol-bis[(di-t-butyl-hydroxyphenyl)propionate [e.g., 1,6-hexanediol-bis[3-(3,5-di-t-butyl-4-hydroxyphenyl)propionate]], a di- or trioxy$C_{2-4}$alkanediol-bis(t-butyl-hydroxyphenyl)propionate [e.g., triethyleneglycol-bis 3-(3-t-butyl-5-methyl-4-hydroxyphenyl) propionate)], a $C_{3-8}$alkanetriol-bis[(di-t-butyl-hydroxyphenyl)propionate, a $C_{4-8}$alkanetetraol tetrakis[(di-t-butyl-hydroxyphenyl)propionate] (e.g., pentaerythritol tetrakis[3-(3,5-di-t-butyl-4-hydroxyphenyl)propionate]], a long-chain alkyl(di-t-butylphenyl)propionate [e.g., n-octadecyl-3-(4',5'-di-t-butylphenyl)propionate, and stearyl-2-(3,5-di-t-butyl-4-hydroxyphenyl)propionate], 2-t-butyl-6-(3-t-butyl-5-methyl-2-hydroxybenzyl)-4-methylphenyl acrylate, and 4,4'-thiobis(3-methyl-6-t-butylphenol). These phenol-series antioxidants may be used alone or in combination. The preferred phenol-series antioxidant to be used may include tetrakis[methylene-3-(3,5-di-t-butyl-4-hydroxyphenyl)propionate]methane, triethylene glycol bis[3-(3-t-butyl-4-hydroxy-5-methylphenyl)propionate], and others.

The thioether-series antioxidant may include, for example, a di(long-chain alkyl)thiodipropionate (for example, dilaurylthiodipropionate, ditridecylthiodipropionate) and a tetrakis[methylene-3-(long-chain alkylthio)propionate]alkane (for example, tetrakis[methylene-3-(dodecylthio)propionate]methane). The long-chain alkyl group may include a straight chain or branched chain $C_{8-20}$alkyl group, and others.

The hindered amine-series antioxidant may include, for example, 4-methoxy-2,2,6,6-tetramethylpiperidine, 4-benzoyloxy-2,2,6,6-tetramethylpiperidine, bis-(2,2,6,6-tetramethyl-4-piperidyl) oxalate, bis-(2,2,6,6-tetramethyl-4-piperidyl) adipate, bis-(2,2,6,6-tetramethyl-4-piperidyl) terephthalate, 1,2-bis(2,2,6,6-tetramethyl-4-piperidyloxy)ethane, phenyl-1-naphthylamine, phenyl-2-naphthylamine, N,N'-diphenyl-1,4-phenylenediamine, and is N-phenyl-N'-cyclohexyl-1,4-phenylenediamine.

The phosphorus-containing antioxidant may include, for example, triisodecyl phosphite, triphenyl phosphite, diphenylisodecyl phosphite, 2,2-methylene bis(4,6-di-t-butylphenyl)octyl phosphite, tris(2,4-di-t-butylphenyl) phosphite, tris(2-t-butylphenyl) phosphite, bis(2-t-butylphenyl)phenyl phosphite, tris(2-(1,1-dimethylpropyl)-phenyl]phosphite, tris(2-t-butyl-4-phenylphenyl) phosphite, and others.

Further, the antioxidant may include a hydroquinone-series antioxidant (for example, 2,5-di-t-butylhydroquinone), a quinoline-series antioxidant (for example, 6-ethoxy-2,2,4-trimethyl-1,2-dihydroquinoline), and others.

These antioxidants may be used alone or in combination. Among these antioxidants, in order to prevent discoloration or hydrolysis, the hindered phenol-series antioxidant is preferred as the antioxidant (D). A combination use of the hindered phenol-series antioxidant and the thioether-series antioxidant more efficiently exerts the above preventive effects. The antioxidant (D) is also desirable for improving the heat stability of the PBT elastomer. Incidentally, in the combination use of the hindered phenol-series antioxidant and the thioether-series antioxidant, the weight ratio of the hindered phenol-series antioxidant relative to the thioether-series antioxidant may be selected from the range of about 90/10 to 10/90 (for example, about 80/20 to 20/80). It is preferable that the weight ratio be adjusted to reduce the amount of the thioether-series antioxidant. The weight ratio of both components may be about 90/10 to 60/40 (for example, about 80/20 to 70/30).

The total amount to be added of the antioxidant (D) relative to 100 parts by weight of the PBT resin (A) and/or the PBN resin (E) is about 0.01 to 5 parts by weight (e.g., about 0.1 to 3 parts by weight), preferably about 0.5 to 3 parts by weight (e.g., about 0.5 to 2 parts by weight) and more preferably about 0.7 to 2.5 parts by weight (e.g. about 0.8 to 2.3 parts by weight). An excessively small amount of the antioxidant (D) is ineffective. An excessively large amount of the antioxidant (D) possibly causes bleeding out of the antioxidant from the molded product.

If necessary, an epoxy compound, particularly a polyepoxy compound (for example, an epoxy resin such as a glycidyl ether-based epoxy resin or a glycidyl ester-based epoxy resin and a vinyl-series copolymer having a glycidyl group) may be added to the resin composition of the present invention. The polyepoxy compound may include, for example, an aromatic epoxy resin (e.g., a bisphenol epoxy resin and a novolak epoxy resin). The vinyl-series copolymer may include, for example, a glycidyl(meth)acrylate copolymer, a $C_{1-4}$alkyl (meth)acrylate-glycidyl(meth)acrylate copolymer, an olefin-glycidyl(meth)acrylate copolymer (such as an ethylene-glycidyl(meth)acrylate copolymer), and an olefin-$C_{1-4}$alkyl (meth)acrylate-glycidyl (meth)acrylate copolymer. These epoxy compounds may be used alone or in combination. The amount to be used of the epoxy compound relative to 100 parts by weight of the PBT resin (A) may be about 0.1 to 20 parts by weight (e.g., about 0-5 to 15 parts by weight) and preferably about 1 to 10 parts by weight.

In the multilayer tube of the present invention, if necessary, an organic or inorganic filler may be added to each layer (for example, the inner layer and/or the outermost layer). The inorganic filler may include, for example, a particulate (or a particle)(e.g., calcium carbonate, a highly dispersive silicate, an alumina, aluminum hydroxide, a talc, a clay, a mica, a glass flake, a glass powder, a glass bead, a quartz powder, a silica sand, a wollastonite, a carbon black, barium sulfate, a calcined gypsum, silicon carbide, boron nitride, and silicon nitride), a plate-like (inorganic compound), a fiber (e.g., a glass fiber and a carbon fiber). These fillers may be used alone or in combination.

Moreover, in the multilayer tube of the present invention, if necessary, a known additive for a thermoplastic resin, a thermosetting resin, or the like may be added to each layer (for example, the inner layer, the barrier layer, and/or the outermost layer) as long as the multilayer tube does not deteriorate in toughness or softness. Such an additive may include, for example, a heat stabilizer other than the above-mentioned antioxidant, a stabilizer (such as an ultraviolet-ray absorbent), an antistatic agent, a coloring agent (e.g., a dye or a pigment), a lubricant, a plasticizer, a crystallization accelerator, a nucleating agent, and a filler.

Incidentally, the PBT resin composition for the outermost layer preferably has a high softness. The flexural modulus thereof, measured by a measuring method defined by ISO178, may be about 100 to 1000 MPa, particularly not more than 600 MPa, preferably about 200 to 550 MPa, and more preferably about 250 to 500 MPa. An excessively low elastic modulus deteriorates the withstanding pressure of the outermost layer and tends to cause the deformation of the outermost layer. In the case of an excessively high elastic modulus, it is necessary to process the outermost layer by a relatively high strength, and the outermost layer exhibits a high repulsive power after attachment or installation.

Further, in the PBT resin composition for the outermost layer, it is preferable that the nominal strain obtained from a tensile test measured by a measuring method described in ISO527-1,2 be not less than 200%.

The multilayer tube of the present invention also has a high durability. For example, the multilayer tube is free from fractures in a 180° bending test after a heat aging treatment at a temperature of 120° C. for 1000 hours.

Further, the multilayer tube is free from fractures in a 180° bending test after a pressure cooker test (at 121° C. under a pressure of 2 atm and a humidity of 100%) for 48 hours.

Furthermore, the multilayer tube of the present invention has an extremely low permeability to a fuel. For example, when a permeability to a composite fuel which is a mixture of 100 parts by volume of a fuel (Fuel C (toluene/isooctane 50/50 (% by volume)) and 10 parts by volume of ethanol is measured in accordance with SHED method, the permeability is not more than 100 mg/test (preferably not more than 10 mg/test, and more preferably not more than 3 mg/test).

Incidentally, in the multilayer tube (for example, a fuel tube), the thickness and flexural modulus of each layer are not particularly limited to specific ones. For example, these values may be referred to the above-mentioned Patent Documents 4 and 5. The thickness of the inner layer may be about 0.01 to 0.5 mm. The thickness of the barrier layer may be about 0.01 to 1 mm. The thickness of the outermost layer may be about 0.1 to 3 mm. In the case of an excessively small thickness of each layer, it is difficult to exert functions of each layer enough. In the case of an excessively large thickness of each layer, the multilayer tube weighs heavier.

The inner diameter of the tube may be, for example, about 3 to 60 mm and preferably about 4 to 40 mm. Moreover, the outer diameter of the tube may be, for example, about 5 to 50 mm and preferably about 7 to 40 mm. An excessively small inner diameter of the tube restricts a fuel flow rate and makes the stiffness of the tube too high. An excessively large inner diameter of the tube deteriorates the stiffness of the tube overall and increases the weight of the tube. Therefore, the attachment or installation of such a tube to a fuel part for an automobile and the like tends to be complicated.

Moreover, regarding the flexural modulus of a material to be used for each layer, the flexural modulus of the material for the inner layer may be about 300 to 2000 MPa and preferably about 1000 to 2000 MPa. The flexural modulus of the material for the barrier layer may be about 1000 to 3000 MPa. The flexural modulus of the material for the outermost layer may be about 100 to 10000 MPa.

The multilayer tube of the present invention may be produced by various processes, for example, according to the following manner.

The material for the inner layer, the material for the barrier layer, and the material for the outermost layer are provided. These PBT resin compositions may be melt-kneaded by three separate kneaders, respectively, and the three layers are extruded (coextruded) simultaneously from a coextrusion molding machine to give a multilayer tube having a three-layer structure (e.g., a fuel tube). These layers can firmly be bonded to each other at the contact surface without using any adhesives by extrusion-molding each layer of each resin composition simultaneously and can be laminated to form a single body. Moreover, if necessary, a straight tube can be formed by a vacuum sizing, or a corrugated tube can be formed by a corrugating machine. Incidentally, in the coextrusion molding, if necessary, an adhesive layer may be interposed between the above-mentioned layers by the coextrusion molding.

Incidentally, the production process of the multilayer tube is not particularly limited to the above-mentioned coextrusion process. For example, the multilayer tube may be produced by forming above-mentioned material for the inner layer into a monolayer tube and extrusion-molding a barrier layer (an intermediate layer) and an outermost layer in this order surrounding the monolayer tube by an extrusion-molding machine or winding a tape-shaped molded product for a barrier layer and a tape-shaped molded product for an outermost layer in this order spirally onto the monolayer tube. If necessary, the pre-molded layer may be surface-roughened by a blasting or coated with an adhesive for laminating the next layer thereon.

In the present invention, since each layer (at least the inner layer and the outer layer) of the multilayer tube comprises the PBT resin composition, the multilayer tube retains a low permeability meeting regulations against emission of fuels and vapor thereof as well as has softness, ductility, impact resistance, and an improved layer-to-layer adhesiveness. Moreover, the multilayer tube (particularly, a multilayer fuel tube) has significantly improved hydrolysis resistance, weather resistance, and compatibility. Further, the multilayer tube (particularly, a multilayer fuel tube) has excellent toughness (including low-temperature toughness), hydrolysis resistance, organic chemical resistance, and ozone resistance.

The multilayer tube (or multilayer pipe) of the present invention has a high impermeability against fuel components and is useful for an application in which the inner layer is contactable with a fuel component, for example, a fuel part in which the inner layer is contactable with an automotive liquid fuel or vapor thereof, e.g., a fuel tube (or a fuel hose, a fuel pipe). The multilayer tube (or fuel tube) is useful for transferring a variety of fuels, for example, a fuel component such as propane, gasoline, or an alcohol blended gasoline (e.g., a liquid fuel and a gas fuel) and utilized as fuel-related devices for vehicles such as an automobile, a flying machine, a two-wheeled vehicle, a tractor, and a cultivator, or peripheral devices thereof (fuel-transfer parts).

EXAMPLES

The following examples are intended to describe this invention in further detail and should by no means be interpreted as defining the scope of the invention.

Example 1

In Example 1, the following materials were used.
(A1) PBT polymer (a poly(butylene terephthalate), manufactured by Win Tech Polymer Ltd., intrinsic viscosity 0.9 dl/g)
(A2) PBT elastomer (ether-based) (manufactured by Toyobo Co., Ltd., "PELPRENE GP400")
(B) Core-Shell Elastomer
Acrylic core-shell polymer: manufactured by Rohm and Haas Japan K.K., "PARALOID EXL2314")
(C) Carbodiimide Compound
Aromatic polycarbodiimide; manufactured by Rhein Chemie Japan Ltd., "STABAXOL P"
(D) Antioxidant
(D1) Hindered phenol-series antioxidant, manufactured by Ciba, "IRGANOX 1010"
(D2) Thioether-series antioxidant; manufactured by ADEKA, "ADKSTAB A0412S"

A PBT resin composition for an inner layer, a PBT resin composition for a barrier layer, and a PBT resin composition for an outermost layer were prepared by using the above-mentioned materials. These compositions were melt-kneaded separately by using an extrusion molding machine (a multilayer extruder manufactured by PLABOR Co., Ltd.) to coextrusion mold a three-layer fuel tube (inner diameter: 12 mm, outer diameter: 14.2 mm) having an inner layer of 300 mm in thickness, a barrier layer of 500 mm in thickness, and an outermost layer of 300 mm in thickness.

Incidentally, the PBT resin composition for the inner layer contained 100 parts by weight of the PBT resin (A1), 25 parts by weight of the core-shell elastomer (B), 0.4 part by weight of the aromatic polycarbodiimide compound (C), and 1 part by weight of the antioxidant (D) [(D1) 0.6 part by weight and (D2) 0.4 part by weight]. The PBT resin composition for the barrier layer contained 100 parts by weight of the PBT resin (A1) and 1 part by weight of the aromatic polycarbodiimide compound (C). The PBT resin composition for the outermost layer contained 100 parts by weight of the PBT resin (A) [(A1) 56 parts by weight and (A-2) 44 parts by weight], 44 parts by weight of the core-shell elastomer (B), 0.6 part by weight of the aromatic polycarbodiimide compound (C), and 1.1 parts by weight of the antioxidant (D) [D1) 0.7 part by weight and (D2) 0-4 part by weight].

Moreover, for each PBT resin composition for the inner layer, the barrier layer, and the outermost layer, the flexural modulus was measured in accordance with a measuring method defined by ISO178. As a result, the flexural modulus of the resin composition for the inner layer was 1500 MPa, that of the resin composition for the barrier layer was 2500

MPa, and that of the resin composition for the outermost layer was 420 MPa. Further, with respect to the resin composition for the outermost layer, the nominal strain defined by a tensile test measured in accordance with a measuring method described in ISO527-1,2 was more than 200%.

Example 2

A multilayer tube was produced in the same manner as in Example 1 except for using (E) a poly(butylene naphthalate) (PBN) resin composition (manufactured by Toyobo Co., Ltd., "PELPRENE EN2000") instead of the PET resin composition for the barrier layer.

Comparative Example 1

A multilayer tube was produced in the same manner as in Example 2 except for using (A3) an ether-based PBT elastomer (manufactured by Toyobo Co., Ltd., "PELPRENE P150B") instead of the PBT resin composition for the outermost layer.

Comparative Example 2

A multi layer tube was produced in the same manner as in Example 2 except for using (A4) a polyester-based PET elastomer resin composition (manufactured by Toyobo Co., Ltd., "PELPRENE S3001") instead of the PET resin composition for the outermost layer.

[Evaluation of Fuel Tube Performances]
The fuel tube performances of each of three-layer tubes obtained in Examples and Comparative Examples were evaluated as follows,

[Amount of Permeated Fuel]
A composite fuel (FC/E10) containing 100 parts by volume of Fuel C (composed of toluene and isooctane in a volume percentage of 50/50) and 10 parts by volume of ethanol was used as a gasoline for the following evaluation tests.

Each tube was filled with the composite fuel, and both ends of the tube were sealed. The tube was allowed to stand at 400° C. for 1000 hours for stabilization. Thereafter, the content (composite fuel) was removed from the tube, and the tube was filled with fresh composite fuel (FC/E10), and both ends of the tube were sealed. The tube was allowed to stand under a predetermined heat cycle environment, and the amount of the permeated fuel was measured every 24 hours. This operation was repeatedly conducted three times. The maximum value of the three measurements was regarded as an amount of permeated fuel per one test [(mg/test=(mg/24 Hr)]. When the amount of permeated fuel was not more than 10 mg/test, the amount of permeated fuel was graded as "A".

[Hydrolysis Resistance (Pressure Cooker Test)]
Each fuel tube was allowed to stand at a temperature of 121° C. under a pressure of 2 atm and a humidity of 100% for 48 hours. Then the fuel tube was bent at an angle of 180°, and the presence of cracks was observed. The tube which had no cracks was graded as "A", and the tube which had cracks was graded as ABE.

[Softness (Flexural Property)]
By using each fuel tube, a stress necessary for a flexure of 10 mm was determined at a support span of 100 mm and a test speed of 100 mm/minute in accordance with three point flexrural test described in JIS K7171.

Incidentally, the flectural stress measured by this test is an index of flectural processability. The smaller the flectural stress is, the more flexible the tube is, resulting in ease of the flectural molding. A tube having a flectural stress of not more than 60 N is usually regarded as a tube having an excellent softness or flexibility. In Table 1, a tube having a flectural stress of not more than 60 N was graded as "A".

[Low-Temperature Softness]
Each fuel tube was cooled at −40° C. for 4 hours and then immediately bent at an angle of 180°, and the presence of cracks was observed. The tube which had no cracks was graded as "A", and the tube which had cracks was graded as "B".

[Resistance to Sour Gasoline]
A mixture of Fuel C (composed of toluene and isooctane in a volume percentage of 50/50) and 5% by weight of lauroyl peroxide (LPO) was prepared and used as a simulated denatured gasoline. Each fuel tube was cut into 10 m length, and two metal pipes were pressed into both ends of the fuel tube, respectively. The simulated denatured gasoline was circulated into the fuel tube under a pressure of 0.3 MPa at 60° C. for 8 hours by a pressure regulator, and thereafter sealed in the fuel tube for 16 hours. This operation was regarded as one cycle, and 10 cycles were conducted.

Thereafter, a sample was taken from the fuel tube. The sample was bent at an angle of 180° and cut at the bent part, and the inner state of the fuel tube was visually observed. From the visual observation, the resistance to sour gasoline was evaluated as follows. The tube which had no abnormality such as cracks was graded as "A", and the tube which had cracks or fractures was graded as "B".

[Peeling Property (Peeling Resistance)]
A burst test was conducted for each tube, and the layer-to-layer condition of the resulting broken sample was observed. The tube having a strong layer-to-layer adhesiveness and no layer peeling or the tube having no layer peeled at a boundary between two layers was graded as "A" and the tube having a layer peeled at a boundary between two layers was graded as "B".

[Heat Aging Resistance]
Each fuel tube was allowed to stand under an environment of 120° C. for 1000 hours, and thereafter the fuel tube was bent at an angle of 180° The heat aging resistance was evaluated as follows. The tube which had no abnormality such as cracks was graded as "A", and the tube which had cracks or fractures was graded as "B".

[Weather Resistance]
The ozone resistance of each fuel tube was measured as one of weather resistance indexes. A sample was allowed to stand in a 50 pphm ozone environment under 40° C. atmosphere, and thereafter the sample was bent at an angle of 180°. The weather resistance was evaluated as follows. The tube which had no abnormality such as cracks was graded as "A", and the tube which had cracks or fractures was graded as "B"

[Weather Resistance]
The xenon resistance of each fuel tube was measured based on ASTM D2565 as one of weather resistance indexes. A sample was allowed to stand and thereafter the sample was bent at an angle of 180° The weather resistance was evaluated as follows. The tube which had no abnormality such as cracks was graded as "A", and the tube which had cracks or fractures was graded as "B".

The results are shown in Table 1.

TABLE 1

|  |  | Examples | | Comparative Examples | |
| --- | --- | --- | --- | --- | --- |
|  |  | 1 | 2 | 1 | 2 |
| Innermost layer | | | | | |
| (A)PBT resin | A-1 | 100 | 100 | 100 | 100 |
| (B)Core-shell polymer |  | 25 | 25 | 25 | 25 |
| (C)Aromatic carbodiimide |  | 0.4 | 0.4 | 0.4 | 0.4 |
| (D)Antioxidant | D-1 | 0.6 | 0.6 | 0.6 | 0.6 |
|  | D-2 | 0.4 | 0.4 | 0.4 | 0.4 |

TABLE 1-continued

|  |  | Examples | | Comparative Examples | |
|---|---|---|---|---|---|
|  |  | 1 | 2 | 1 | 2 |
| Barrier layer | | | | | |
| (A)PBT resin | A-1 | 100 | | | |
| (E)PBN resin | | | 100 | 100 | 100 |
| (C)Aromatic carbodiimide | | | 1 | | |
| Outermost layer | | | | | |
| (A)PBT resin | A-1 | 56 | 56 | | |
|  | A-2 | 44 | 44 | | |
|  | A-3 | | | 100 | |
|  | A-4 | | | | 100 |
| (B)Core-shell polymer | | 44 | 44 | | |
| (C)Aromatic carbodiimide | | 0.6 | 0.6 | | |
| (D)Antioxidant | D-1 | 0.7 | 0.7 | | |
|  | D-2 | 0.4 | 0.4 | | |
| Tube performances | | | | | |
| Amount of permeated fuel | | A | A | A | A |
| Hydrolysis resistance | | A | A | A | B |
| Softness | | A | A | A | A |
| Low-temperature softness | | A | A | A | A |
| Resistance to sour gasoline | | A | A | A | A |
| Peeling property | | A | A | A | A |
| Heat aging resistance | | A | A | A | A |
| Weather resistance (ozone) | | A | A | B | A |
| Weather resistance (xenon) | | A | A | B | A |

What is claimed is:

1. A multilayer tube comprising at least the following three layers:
   an inner layer contactable with a fuel component,
   a barrier layer preventing permeation of the fuel component, and
   an outermost layer,
   wherein
   the inner layer comprises a poly(butylene terephthalate) resin composition containing
      (A) a poly(butylene terephthalate) resin,
      (B) an elastomer component comprising an acrylic core-shell elastomer free from a diene component, and
      (C) an aromatic polycarbodiimide compound,
   the barrier layer comprises a polyester resin composition, and
   the outermost layer comprises a poly(butylene terephthalate) resin composition containing
      (A) a poly(butylene terephthalate) resin comprising (A1) at least one member selected from the group consisting of a poly(butylene terephthalate) homopolymer and a poly(butylene terephthalate) copolymer, and (A2) a polyester elastomer,
      (B) an elastomer component comprising an acrylic core-shell elastomer free from a diene component,
      (C) an aromatic polycarbodiimide compound, and
      (D) an antioxidant.

2. A multilayer tube according to claim 1, wherein the polyester resin composition constituting the barrier layer comprises at least one member selected from the group consisting of
   (A) a poly(butylene terephthalate) resin and
   (E) a poly(butylene naphthalate) resin.

3. A multilayer tube according to claim 1, wherein the polyester resin composition constituting the barrier layer comprises (A) a poly(butylene terephthalate) resin, each poly(butylene terephthalate) resin (A) forming the inner layer and the barrier layer comprises (A1) at least one member selected from the group consisting of a poly(butylene terephthalate) homopolymer and a poly(butylene terephthalate) copolymer and (A2) a polyester elastomer.

4. A multilayer tube according to claim 1 or 3, wherein the polyester elastomer (A2) contains a poly(butylene terephthalate) segment as a hard segment in a proportion of 20 to 90% by weight.

5. A multilayer tube according to claim 1, wherein the polyester resin composition constituting the barrier layer comprises (A) a poly(butylene terephthalate) resin, each poly(butylene terephthalate) resin (A) forming the inner layer, the barrier layer, and the outermost layer contains (A1) at least one member selected from the group consisting of a poly(butylene terephthalate) homopolymer and a poly(butylene terephthalate) copolymer and (A2) a polyester elastomer, and the weight ratio of the polymer (A1) relative to the elastomer (A2) is 30/70 to 70/30.

6. A multilayer tube according to claim 1, wherein the antioxidant (D) comprises
   a hindered phenol-series antioxidant or
   a hindered phenol-series antioxidant and a thioether-series antioxidant.

7. A multilayer tube according to claim 1, wherein
   the inner layer, the barrier layer, and the outermost layer are directly bonded in this order by coextrusion without using an adhesive agent,
   the inner layer contains 20 to 40 parts by weight of the elastomer component (B) and 0.01 to 5 parts by weight of the aromatic polycarbodiimide compound (C) relative to 100 parts by weight of the poly(butylene terephthalate) resin (A),
   the barrier layer contains 0 to 5 parts by weight of the aromatic polycarbodiimide compound (C) relative to 100 parts by weight of the poly(butylene terephthalate) resin (A), a poly(butylene naphthalate) resin (E), or both, and
   the outermost layer contains 10 to 80 parts by weight of the elastomer component (B), 0.01 to 5 parts by weight of the aromatic polycarbodiimide compound (C) and 0.01 to 5 parts by weight of the antioxidant (D) relative to 100 parts by weight of the poly(butylene terephthalate) resin (A).

8. A multilayer tube according to claim 1, wherein the poly(butylene terephthalate) resin composition for the outermost layer has
   a softness which is expressed by a flexural modulus measured in accordance with a measuring method defined by ISO178 of not more than 600 MPa and
   a nominal strain defined by a tensile test measured in accordance with a measuring method described in ISO527-1,2 of not less than 200%.

9. A multilayer tube according to claim 1, which is a fuel tube, wherein the inner layer is contactable with an automotive liquid fuel or a vapor thereof.

10. A multilayer tube according to claim 1, which is free from fractures in a 180° bending test after a heat aging treatment at a temperature of 120° C. for 1000 hours.

11. A multilayer tube according to claim 1, which is free from fractures in a 180° bending test after a pressure cooker test at 121° C. under 2 atm for 48 hours.

12. A multilayer tube according to claim 1, which has a permeability of not more than 10 mg/test as a permeability to a fuel measured in accordance with SHED method, wherein the fuel is a composite fuel which contains 10 parts by volume of ethanol relative to 100 parts by volume of Fuel C containing toluene and isooctane in a volume percentage ratio of 50/50.

* * * * *